G. W. La Baw.

Miter Boxes.

No. 3,445. Reissued May 18, 1869.

Inventor.
George W. LaBaw

N. PETERS, PHOTO-LITHOGRAPHER, WASHINGTON, D. C.

United States Patent Office.

GEORGE W. LA BAW, OF JERSEY CITY, NEW JERSEY.

*Letters Patent No.* 12,956, *dated May* 29, 1855; *reissue No.* 3,445, *dated May* 18, 1869.

IMPROVEMENT IN MITRE-MACHINES.

The Schedule referred to in these Letters Patent and making part of the same.

*To all whom it may concern:*

Be it known that I, GEORGE W. LA BAW, of Jersey City, in the county of Hudson, and State of New Jersey, have invented certain new and useful Improvements in Machines for Cutting Mitre-Joints and Squaring Mouldings and Trimmings of various kinds; and I do hereby declare the following to be a full, clear, and exact description of the construction and operation of the same, reference being had to the accompanying drawings, in which—

Figure 1:
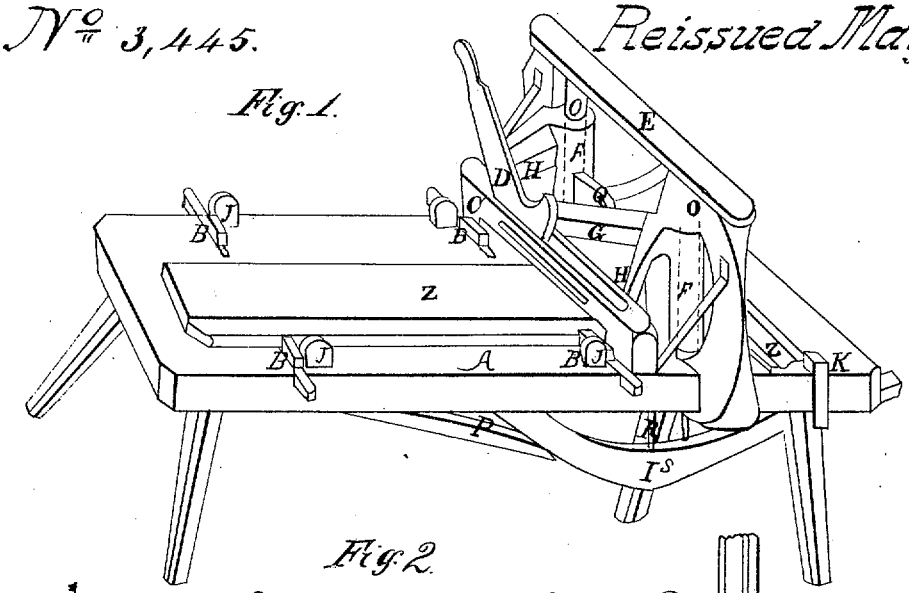

Figure 1 is a perspective view of the mitre and cutting-machine.

Figure 2:
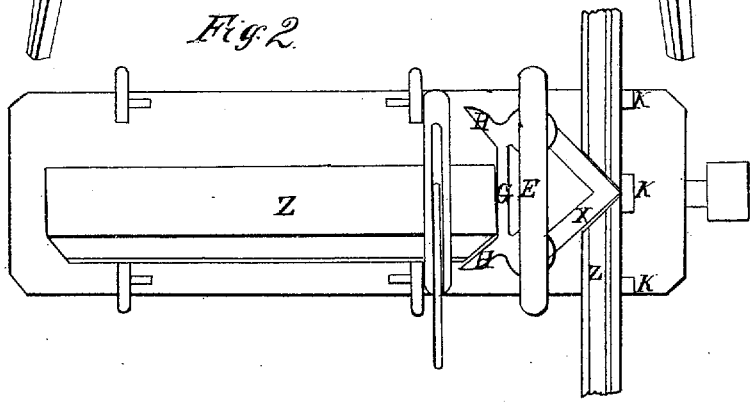

Figure 2, a top view of the machine.

Figure 3:
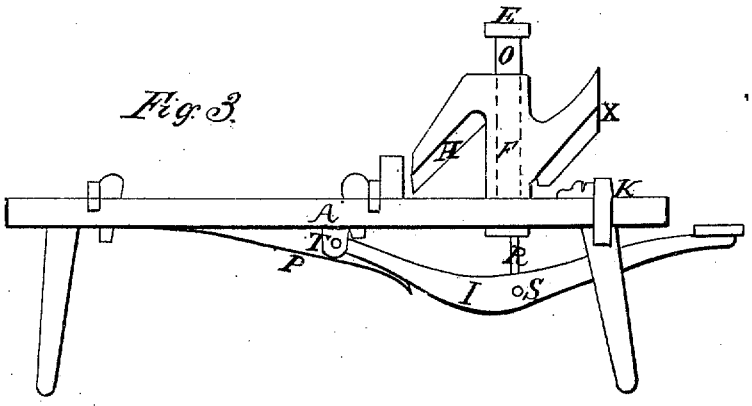

Figure 3, a side elevation.

Similar letters of reference indicate like parts in the several drawings.

My invention consists,

First, in the construction and arrangement of an angular cutter, which reciprocates vertically, and cuts mitres in material with a shear-cut.

Second, in so constructing and arranging angular cutters reciprocating vertically, that both a mitre and a square joint may be cut simultaneously in material with a shear-cut.

Third, in a mechanism for holding the material for the action of the cutting-knives.

To enable others skilled in the art to make and use my invention, I will describe its construction and operation.

To the table A, which is provided with legs or other proper supports, is secured the frame composed of the two uprights and the cross-bar E.

This frame supports the rods O O, upon which the angular cutters slide.

On the table A are arranged four adjustable gauges, B B B B, held in place by the keys J J J J, by which the moulding Z is adjusted for the action of the cutters.

The eccentric handle D operates to hold the material firmly in place while being cut. It works in the slotted bar C, bolted to the table, and is so arranged as to be adjustable at any point in the bar, as plainly seen in fig. 1.

K K is a sliding guide-plate, upon which the material to be acted upon by the cutter X is adjusted.

The series of knives, which constitute the cutter of the machine, designated as G, H H, and X, are properly secured to the stock F F, which is cast of the shape shown, and so planed and surfaced as to slide evenly upon the rods O O, and accurately hold the knives in position at their proper angles. The knives are all set at angles, inclined to the plane of the table A, so as to operate with a shear-cut, producing a clean surface on the material, with a great reduction in the force required to operate the machine.

Motion is given to the cutters by means of the treadle I, pivoted underneath the table at T.

It is pivoted to the rod I, secured to the cross-bar Q, of the cutter-stock, and when the foot is removed, it is reacted by the spring P.

The operation is as follows:

To cut a moulding, the piece Z is laid upon the slide K K, and held in proper position under the cutter X, and the foot of the operator applied to the treadle, so that by the same being forced downward, a clean cut of the material is obtained at the required angle. By adjusting the moulding properly on the rest K, the machine may be caused to cut any desired angle, as, for instance, that required for mouldings to form an octagon-frame.

To cut a square, or square and mitre-joint, the piece Z is laid upon the table, one edge resting against the gauges B B, while the end nearest the cutters is placed under the cross-bar C, in the required proximity to the knives. The clamp-lever D is then operated to hold the piece in place, and the knives operated to cut the material by the treadle I. The clamp D, being adjustable, enables either a wide or narrow piece of moulding to be securely held in any position beneath the bar C.

Having thus fully described my invention,

What I claim, and desire to secure by Letters Patent, is—

1. The knives or cutters G, H H, and X, attached to the stock F, in combination with the mechanism for operating the same, substantially as described, and for the purposes specified.

2. The knives, or cutter X, arranged as described, in combination with mechanism for operating the same, for cutting mitres, substantially as described and specified.

3. The mechanism for holding the material for cutting mitre and square joints, consisting of the bar C, slotted both vertically and horizontally, and the eccentric lever D, constructed substantially as described, and for the purpose specified.

GEOR. W. LA BAW.

Witnesses:

C. A. DURGIN,

EDWARD E. OSBORN.